US012621559B2

(12) United States Patent
Ueno

(10) Patent No.: US 12,621,559 B2
(45) Date of Patent: May 5, 2026

(54) ELECTRONIC DEVICE

(71) Applicant: CANON KABUSHIKI KAISHA,
Tokyo (JP)

(72) Inventor: Daiyu Ueno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 18/612,437

(22) Filed: Mar. 21, 2024

(65) Prior Publication Data
US 2024/0323520 A1      Sep. 26, 2024

(30) Foreign Application Priority Data

Mar. 23, 2023      (JP) ................................. 2023-046964

(51) Int. Cl.
*H04N 23/63* (2023.01)
*H04N 23/667* (2023.01)

(52) U.S. Cl.
CPC ......... *H04N 23/633* (2023.01); *H04N 23/667* (2023.01); *H04N 23/632* (2023.01)

(58) Field of Classification Search
CPC .. H04N 23/631; H04N 23/632; H04N 23/633; H04N 23/635; H04N 23/667
See application file for complete search history.

(56) References Cited

U.S. PATENT DOCUMENTS

2011/0273573 A1* 11/2011 Sato ........................ H04N 5/772
                                                           348/220.1
2011/0279696 A1* 11/2011 Nakata ................... H04N 25/71
                                                           348/220.1

FOREIGN PATENT DOCUMENTS

JP        2007221451 A      8/2007
JP        2010226185 A   * 10/2010

OTHER PUBLICATIONS

Machine Translation of JP2010-226185 (Year: 2010).*

* cited by examiner

*Primary Examiner* — Daniel M Pasiewicz
(74) *Attorney, Agent, or Firm* — Canon U.S.A., Inc. IP Division

(57) ABSTRACT

An electronic device acquires a live view image; and performs control such that the live view image is displayed. During moving image shooting, the electronic device performs control such that a first item indicating that the moving image shooting is being performed is displayed together with the live view image. When still image shooting is performed, the electronic device performs control such that a second item indicating that the still image shooting is being performed is temporarily displayed together with the live view image. When still image shooting is performed in a state where moving image shooting is performed and the first item is displayed, the electronic device performs control such that an item to be displayed is temporarily switched from the first item to the second item.

15 Claims, 8 Drawing Sheets

ELECTRONIC DEVICE

BACKGROUND

Technical Field

The present disclosure relates to an electronic device, and particularly relates to a technology of displaying an item indicating that shooting is being performed.

Description of the Related Art

A typical digital camera has a still image shooting function and a moving image shooting function. In moving image shooting, moving image data resulting from image capturing by an image capturing element is stored in a temporary storage region, and then written to a recording medium such as a memory card or a hard disk. A technology has been proposed in which, as an item indicating that moving image shooting is in progress, a red frame along an outline of a display surface is displayed during the moving image shooting.

In an image capturing apparatus such as a digital camera or a smartphone (camera application), still image shooting using an electronic shutter and not involving driving of a mechanical shutter may be performed. The electronic shutter is appropriate for the still image shooting in a quiet environment but, in the still image shooting using the electronic shutter, no shutter sound caused by driving the mechanical shutter is heard. Accordingly, a technology has been proposed in which, as an item indicating that still image shooting is in progress (still image shooting is being performed) when the still image shooting is performed, a white frame along an outline of a display surface is displayed.

There may also be a case where the still image shooting is performed during the moving image shooting. A technology related to the still image shooting during the moving image shooting is disclosed in Japanese Patent Application Publication No. 2007-221451.

However, in the technology disclosed in Japanese Patent Application Publication No. 2007-221451, a user cannot easily be notified whether or not the still image shooting is currently in progress, whether or not the moving image shooting is in progress, or whether or not the still image shooting is in progress during the moving image shooting.

SUMMARY

The present disclosure allows a user to easily recognize that both moving image shooting and still image shooting are being performed, while maintaining visibility of a live view image.

An electronic device according to the present disclosure includes at least one memory and at least one processor which function as: an acquisition unit configured to acquire a live view image; and a display control unit configured to perform control such that the live view image is displayed, wherein during moving image shooting, the display control unit performs control such that a first item indicating that the moving image shooting is being performed is displayed together with the live view image, when still image shooting is performed, the display control unit performs control such that a second item indicating that the still image shooting is being performed is temporarily displayed together with the live view image, and when still image shooting is performed in a state where moving image shooting is performed and the first item is displayed, the display control unit performs control such that an item to be displayed is temporarily switched from the first item to the second item.

Further features of the present disclosure will become apparent from the following description of exemplary embodiments with reference to the attached drawings.

DESCRIPTION OF THE EMBODIMENTS

Figure 1A:
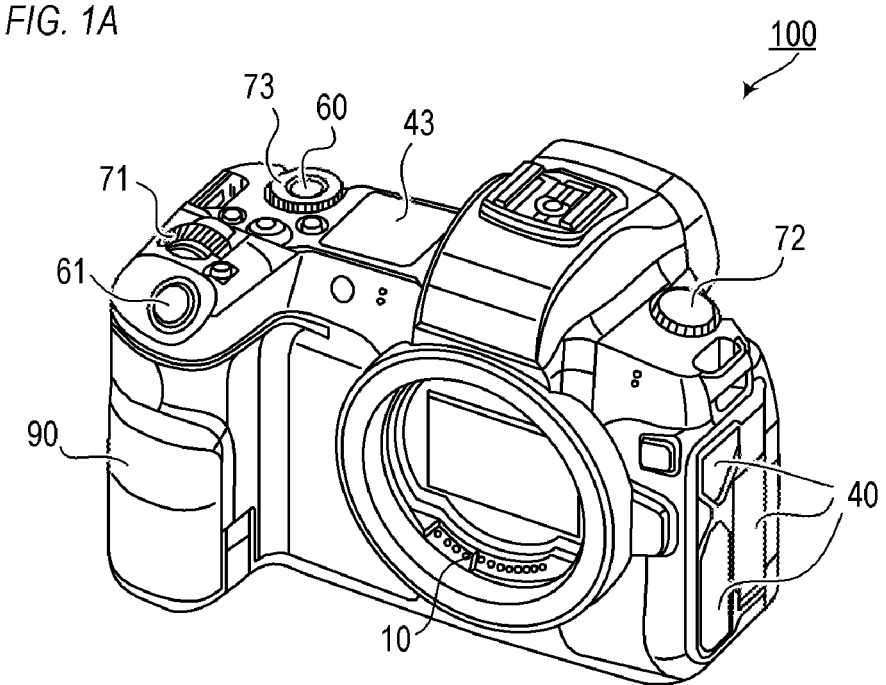
FIGS. 1A and 1B are external views of a digital camera.
Figure 1B:
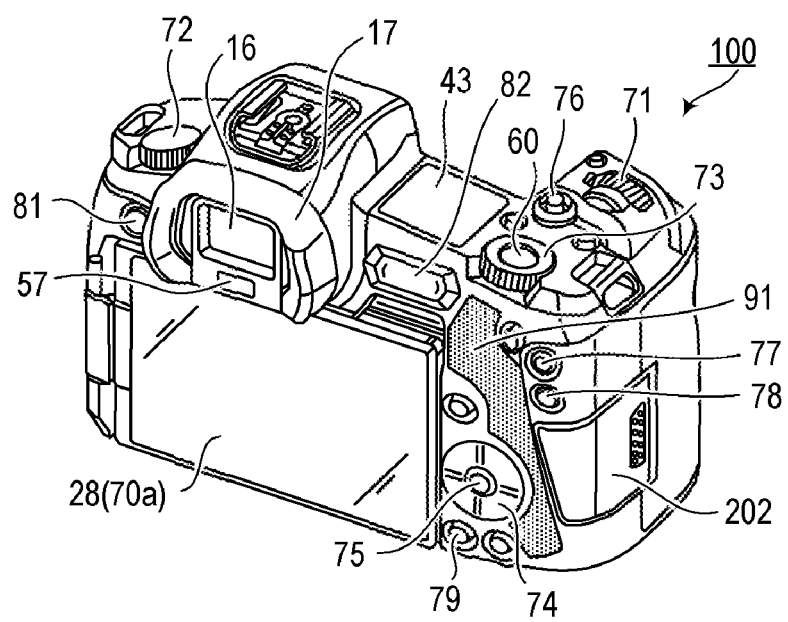

Referring to the drawings, embodiments of the present disclosure will be described below. FIGS. 1A and 1B are external views of a digital camera 100 (image capturing apparatus) as an example of an apparatus (electronic device) to which the present disclosure is applicable. FIG. 1A is a front perspective view of the digital camera 100, while FIG. 1B is a rear perspective view of the digital camera 100.

A display unit 28 is a display unit provided in a rear surface of the digital camera 100 to display an image and various information. A touch panel 70a can detect a touch operation performed on a display surface (touch operation surface) of the display unit 28. An outside viewfinder display unit 43 is a display unit provided in an upper surface of the digital camera 100 to display various set values for the digital camera 100 represented by a shutter speed and an aperture. A shutter button 61 is an operation member for giving a shooting instruction. A mode changeover switch 60 is an operation member for switching between various modes. Terminal covers 40 are covers covering connectors (not shown) to a connection cable connecting the digital camera 100 to an external device and the like.

A main electronic dial 71 is a rotating operation member and, by rotating the main electronic dial 71, it is possible to make changes or the like to the set values such as the shutter speed and the aperture. A power source switch 72 is an operation member for switching a power source of the digital camera 100 between ON/OFF states. A sub electronic dial 73 is a rotating operation member and, by rotating the sub electronic dial 73, it is possible to move a selection frame (cursor) or perform image forwarding or the like. A four-direction key 74 is configured such that each of upper, lower, left, and right portions can be pushed in, and processing corresponding to the pushed portion of the four-direction key 74 is possible. A SET button 75 is a push button which is used mainly for determination of a selected item or the like.

A moving image button 76 is used to give an instruction to start or stop moving image shooting (recording). An AE lock button 77 is a push button and, by pressing the AE lock button 77 in a shooting standby state, it is possible to fix an exposure state. An enlargement button 78 is an operation button for switching an enlargement mode between ON/OFF states in live view display (LV display) in a shooting mode. By turning ON the enlargement mode and then operating the main electronic dial 71, it is possible to enlarge or reduce a live view image (LV image). In a reproduction mode, the enlargement button 78 functions as an operation button for enlarging a reproduced image or increasing a magnification power therefor. A reproduction button 79 is an operation button for switching between the shooting mode and the reproduction mode. By pressing the reproduction button 79 during the shooting mode, the shooting mode is shifted to the reproduction mode, and a newest image among images recorded on a recording medium 200 (described later) can be displayed on the display unit 28. A menu button 81 is a push button to be used to perform an instruction operation to display a menu screen and, when the menu button 81 is pressed, the menu screen that allows various settings to be made is displayed on the display unit 28. By using the menu screen displayed on the display unit 28, the four-direction key 74, and the SET button 75, a user can intuitively make various settings. By changing the settings in the menu screen, the user can change (customize) functions to be allocated to the operation members (such as the buttons and the rotating operation members).

A touch bar 82 is a linear touch operation member (line touch sensor) capable of receiving a touch operation. The touch bar 82 is disposed at a position which allows a touch operation to be performed thereon (where the touch bar 82 can be touched) with a right thumb in a state where a grip portion 90 is gripped with a right hand (gripped with right little, ring, and middle fingers) so as to allow the shutter button 61 to be pressed with a right index finger. In other words, the touch bar 82 is disposed at a position where the touch bar 82 can be operated in a state (shooting orientation) where the user looks in an eyepiece viewfinder 17 with the eye closer to an eyepiece unit 16, and is ready to press the shutter button 61 at any time. The touch bar 82 is a reception unit capable of receiving a tap operation (operation of touching the touch bar 82 and releasing the touch bar 82 within a predetermined period without moving a touch position) performed on the touch bar 82, a leftward or rightward slide operation (operation of touching the touch bar 82 and then moving the touch position, while touching the touch bar 82), and the like. The touch bar 82 is an operation member different from the touch panel 70*a*, and does not include a displaying function. The touch bar 82 functions as, e.g., a multi-function bar (M-Fn bar) to which various functions can be allocated.

A communication terminal 10 is a communication terminal for the digital camera 100 to perform communication with a lens unit 150 (described later; detachable) side. The eyepiece unit 16 is the eyepiece unit of the eyepiece viewfinder 17 (look-in-type viewfinder), and the user can visually recognize a video displayed on an internal EVF 29 (described later; electronic viewfinder) via the eyepiece unit 16. An eye approach sensing unit 57 is an eye approach sensing sensor that senses whether or not the eye of the user (shooter) is closer to the eyepiece unit 16. A lid 202 is a lid of a slot in which the recording medium 200 (described later) is to be stored. The grip portion 90 is a held portion formed in a shape easily gripped by the right hand when the user holds the digital camera 100. The shutter button 61 and the main electronic dial 71 are disposed at positions where the shutter button 61 and the main electronic dial 71 can be operated with the right index finger in a state where the digital camera 100 is held with the right little, ring, and middle fingers gripping the grip portion 90. In addition, the sub electronic dial 73 and the touch bar 82 are disposed at positions where the sub electronic dial 73 and the touch bar 82 can be operated with the right thumb in the same state.

A thumb rest portion 91 (thumb standby position) is a grip portion provided at a position on a rear side of the digital camera 100 where the right thumb gripping the grip portion 90 can easily be placed in a state where no operation member is operated. The thumb rest portion 91 is formed of a rubber member for increasing a holding force (grip feeling) or the like.

Figure 2:
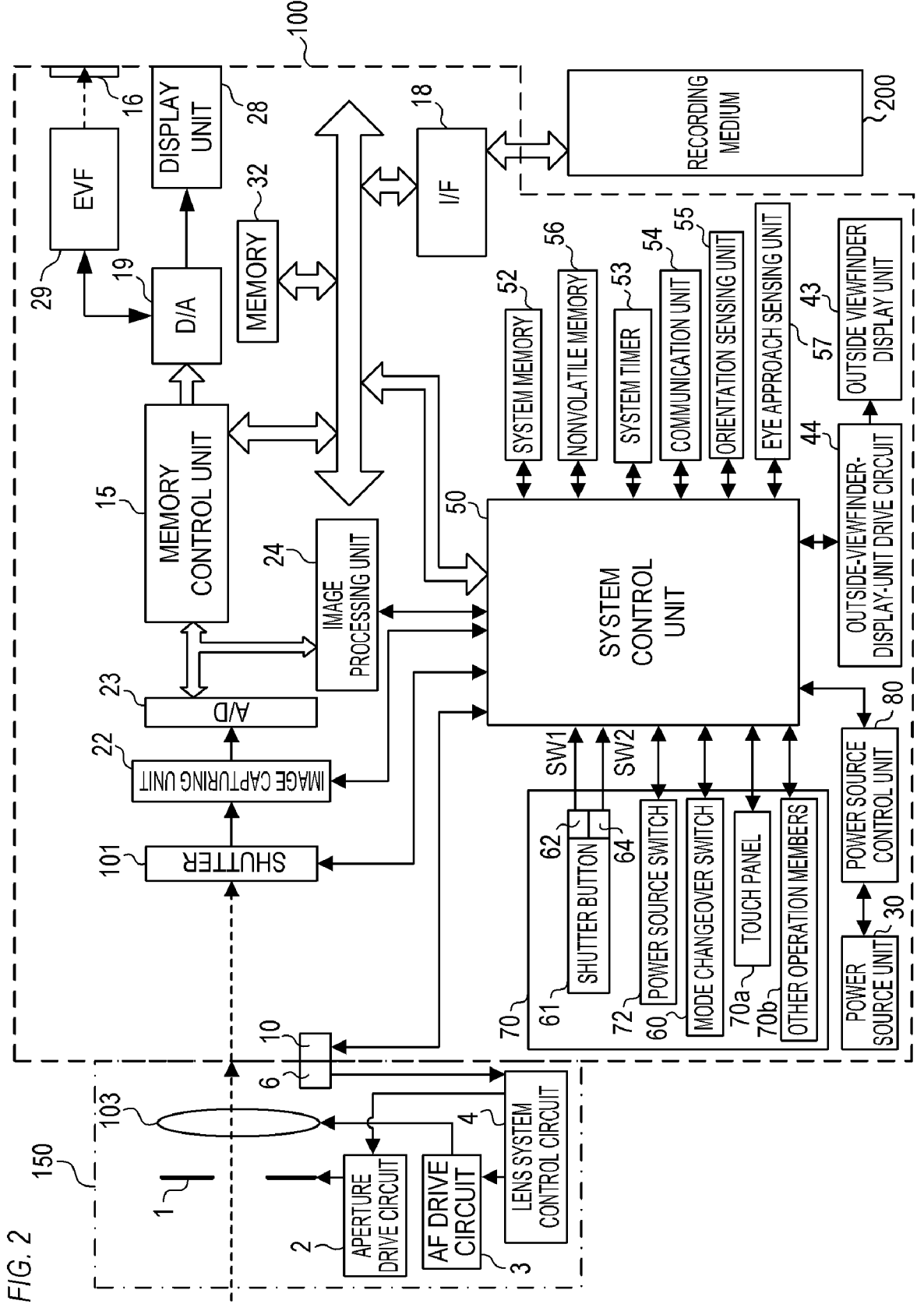
FIG. 2 is a block diagram of the digital camera.

FIG. 2 is a block diagram illustrating a configuration of the digital camera 100. The lens unit 150 is a lens unit in which a replaceable shooting lens is to be mounted. A lens 103 typically includes a plurality of lenses, but is briefly illustrated as a mere single lens in FIG. 2. A communication terminal 6 is a communication terminal for the lens unit 150 to perform communication with the digital camera 100 side, while the communication terminal 10 is a communication terminal for the digital camera 100 to perform communication with the lens unit 150 side. The lens unit 150 communicates with a system control unit 50 via these communication terminals 6 and 10. Then, the lens unit 150 uses an internal lens system control circuit 4 to control an aperture 1 via an aperture drive circuit 2. In addition, the lens unit 150 uses the lens system control circuit 4 to displace the lens 103 via an AF drive circuit 3 and thereby carry out focusing.

A shutter 101 is a focal-plane shutter capable of freely controlling an exposure time for an image capturing unit 22 under the control of the system control unit 50.

The image capturing unit 22 is an image capturing element (image sensor) including a CCD, a CMOS element, or the like that converts an optical image to an electric signal. The image capturing unit 22 may also have an image-capturing-surface phase difference sensor that outputs defocus amount information to the system control unit 50. An A/D converter 23 converts an analog signal output from the image capturing unit 22 to a digital signal.

An image processing unit 24 performs predetermined processing (such as re-size processing such as pixel interpolation or reduction or color conversion processing) on data from the A/D converter 23 or data from the memory control unit 15. In addition, the image processing unit 24 uses image data resulting from image capturing to perform predetermine arithmetic operation processing, while the system control unit 50 performs exposure control and ranging control on the basis of a result of an arithmetic operation obtained by the image processing unit 24. Thus, TTL-type (through-the-lens-type) AF (auto-fucus) processing, AE (automatic exposure) processing, EF (flash pre-emission) processing, or the like is performed. The image processing unit 24 uses the image data resulting from the image capturing to further perform predetermined arithmetic operation processing, and performs TTL-type AWB (auto white balance) processing on the basis of the obtained result of the arithmetic operation.

A memory control unit 15 controls data transmission/reception among the A/D converter 23, the image processing unit 24, and a memory 32. Output data from the A/D converter 23 is written to the memory 32 via the image processing unit 24 and the memory control unit 15. Alternatively, the output data from the A/D converter 23 is written to the memory 32 via the memory control unit 15 without interposition of the image processing unit 24. The memory 32 stores image data obtained by the image capturing unit 22 and converted to digital data by the A/D converter 23 and image data to be displayed on the display unit 28 and the EVF 29. The memory 32 includes a sufficient storage capacity to store a predetermined number of still images and a moving image and voice during a predetermined time period.

In addition, the memory 32 serves also as a memory (video memory) for image display. A D/A converter 19 converts image data for display stored in the memory 32 to an analog signal and supplies the analog signal to the display unit 28 and the EVF 29. Thus, the image data for display written to the memory 32 is displayed by the display unit 28 and the EVF 29 via the D/A converter 19. Each of the display unit 28 and the EVF 29 is a display such as an LCD or an organic EL, and performs display according to the analog signal from the D/A converter 19. By converting the digital signal resulting from A/D conversion performed by the A/D converter 23 and stored in the memory 32 to the analog signal in the D/A converter 19, sequentially transferring the analog signal to the display unit 28 or the EVF 29, and displaying the analog signal thereon, the live view display (LV) can be performed. Hereinbelow, an image displayed in the live view display is referred to as a live view image (LV image).

The system control unit 50 is a control unit including at least one processor and/or at least one circuit to control the entire digital camera 100. The system control unit 50 is not only a processor, but also a circuit. The system control unit 50 executes a program recorded in a nonvolatile memory 56 to implement each processing described later. In addition, the system control unit 50 controls the memory 32, the D/A converter 19, the display unit 28, the EVF 29, and the like to also perform display control.

A system memory 52 is, e.g., a RAM, and the system control unit 50 develops, in the system memory 52, constants and variables each for the operation of the system control unit 50, the program read out of the nonvolatile memory 56, and the like.

The nonvolatile memory 56 is an electrically erasable/recordable memory such as, e.g., an EEPROM. In the nonvolatile memory 56, the constants for the operation of the system control unit 50, the program, and the like are recorded. The program mentioned herein refers to a program for executing various flow charts described later.

A system timer 53 is a timer unit that measures time to be used for various control and time in an embedded clock.

A communication unit 54 performs transmission/reception of a video signal and an audio signal to/from an external device connected thereto via a wireless or wired cable. The communication unit 54 can be connected also to a wireless LAN (Local Area Network) or the Internet. The communication unit 54 can also communicate with the external device via the Bluetooth (registered trademark) or Bluetooth Low Energy. The communication unit 54 can transmit images (including the LV image) captured by the image capturing unit 22 and an image recorded on the recording medium 200, and can receive image data and various other information from the external device.

An orientation sensing unit 55 senses an orientation of the digital camera 100 with respect to a gravity direction. It is possible to determine, on the basis of the orientation sensed by the orientation sensing unit 55, whether the image captured by the image capturing unit 22 is an image captured by laterally holding the digital camera 100 or an image captured by vertically holding the digital camera 100. The system control unit 50 can add orientation information according to the orientation sensed by the orientation sensing unit 55 to an image file of the image captured by the image capturing unit 22 or rotate and record the image. As the orientation sensing unit 55, an acceleration sensor, a gyro sensor, or the like can be used. It is also possible to use the acceleration sensor or gyro sensor serving as the orientation sensing unit 55 and sense movement of the digital camera

100 (such as panning, tilting, lifting, or whether or not the digital camera 100 is stationary).

The eye approach sensing unit 57 senses approach (eye approach) (approach sensing) of the eye (object) and separation (eye separation) thereof to and from the eyepiece unit 16 of the eyepiece viewfinder 17 (hereinafter referred to simply as the "viewfinder"). The system control unit 50 switches the display unit 28 and the EVF 29 between display (display state)/non-display (non-display state) depending on a state sensed by the eye approach sensing unit 57. More specifically, at least in the shooting standby state and in a case where switching setting of a display destination is automatic switching, during non-eye approach, the display destination is set to the display unit 28, and the display is turned ON, while the EVF 29 is switched to the non-display. Meanwhile, during the eye approach, the display destination is set to the EVF 29, and the display is turned ON, while the display unit 28 is switched to the non-display. As the eye approach sensing unit 57, e.g., an infrared proximity sensor can be used to be able to sense approach of any object to the eyepiece unit 16 of the viewfinder 17 in which the EVF 29 is embedded. When an object has approached, infrared light projected from a light projecting unit (not shown) of the eye approach sensing unit 57 is reflected by the object to be received by a light receiving unit (not shown) of the infrared proximity sensor. On the basis of an amount of the received infrared light, a distance (eye approach distance) between the object approaching the eyepiece unit 16 and the eyepiece unit 16 can be detected. Thus, the eye approach sensing unit 57 performs eye approach sensing in which a proximity distance of the object to the eyepiece unit 16 is sensed. It is assumed that, when an object approaching the eyepiece unit 16 within a predetermined distance is detected in a non-eye approach state (non-approach state), eye approach is detected. It is assumed that, when the object the approach of which has been sensed in an eye approach state (proximity state) moves away therefrom at a predetermined distance or more, eye separation is detected. A threshold for detecting the eye approach and a threshold for detecting the eye separation may be different from each other by providing, e.g., hysteresis or the like. It is also assumed that, after the eye approach is detected, the eye approach state continues until the eye separation is detected. It is also assumed that, after the eye separation is detected, the non-eye approach state continues until the eye approach is detected. Note that the infrared proximity sensor is an example and, as the eye approach sensing unit 57, another sensor may also be adopted as long as a state that can be regarded as the eye approach can be sensed thereby.

On the outside viewfinder display unit 43, various set values for the camera represented by the shutter speed and the aperture are displayed via an outside-viewfinder-display-unit drive circuit 44.

A power source control unit 80 is configured to include a battery detection circuit, a DC-DC converter, a switch circuit that switches a block to be energized, and the like, and performs detection of the presence or absence of attachment of a battery, a type of the battery, and a battery level, or the like. In addition, the power source control unit 80 controls the DC-DC converter on the basis of a result of the detection and an instruction from the system control unit 50, and supplies a required voltage to each of the units including the recording medium 200 for a required period. The power source unit 30 includes a primary battery such as an alkaline battery or a lithium battery, a secondary battery such as a NiCd battery, a NiMH battery, or a Li battery, an AC adapter, and the like.

A recording medium I/F 18 is an interface with the recording medium 200 such as a memory card or a hard disk. The recording medium 200 is a recording medium for recording an image resulting from shooting, such as a memory card, and is configured to include a semiconductor memory, a magnetic disk, or the like.

An operation unit 70 is an input unit that receives an operation (user operation) from the user, and is used to input various operation instructions to the system control unit 50. As illustrated in FIG. 2, the operation unit 70 includes the mode changeover switch 60, the shutter button 61, the power source switch 72, the touch panel 70*a*, other operation members 70*b*, and the like. The other operation members 70*b* include the main electronic dial 71, the sub electronic dial 73, the four-direction key 74, the SET button 75, the moving image button 76, the AE lock button 77, the enlargement button 78, the reproduction button 79, the menu button 81, the touch bar 82, and the like.

The mode changeover switch 60 switches an operation mode of the system control unit 50 to any of a still image shooting mode, a moving image shooting mode, a reproduction mode, and the like. As modes included in the still image shooting mode, there are an auto shooting mode, an auto scene determination mode, a manual mode, an aperture-value mode (Av mode), a shutter-speed priority mode (Tv mode), and a program AE mode (P mode). There are also various scene modes corresponding to shooting settings for individual shooting scenes, a custom mode, and the like. Using the mode changeover switch 60, the user can switch the operation mode directly to any of these modes. Alternatively, it may also be possible to temporarily switch a screen to be displayed to a shooting mode list screen by using the mode changeover switch 60 and then selectively switch the operation mode to any of the plurality of displayed modes by using another operation member. Likewise, the moving image shooting mode may also include a plurality of modes.

The shutter button 61 includes a first shutter switch 62 and a second shutter switch 64. The first shutter switch 62 is turned ON by so-called halfway pressing (shooting preparation instruction) during the operation of the shutter button 61 to generate a first shutter switch signal SW1. The system control unit 50 starts, on the basis of the first shutter switch signal SW1, a shooting preparing operation such as the AF (auto-focus) processing, the AE (auto exposure) processing, AWB (auto white balance) processing, or the EF (flash pre-emission) processing. The second shutter switch 64 is turned ON by completion of the operation of the shutter button 61, i.e., by so-called full pressing (shooting instruction) to generate a second shutter switch signal SW2. The system control unit 50 starts, on the basis of the second shutter switch signal SW2, an operation of sequential shooting processing from signal reading from the image capturing unit 22 to writing of a captured image as the image file to the recording medium 200.

The touch panel 70*a* is a touch sensor that detects various touch operations performed on a display surface (operation surface of the touch panel 70*a*) of the display unit 28. The touch panel 70*a* and the display unit 28 can be integrally configured. For example, the touch panel 70*a* is configured such that a light transmittance does not interrupt display on the display unit 28, and is attached to an upper layer of the display surface of the display unit 28. Then, input coordinates on the touch panel 70*a* are associated with display coordinates on the display surface of the display unit 28. Thus, it is possible to provide such a GUI (graphical user interface) as to allow the user to directly operate a screen displayed on the display unit 28.

The system control unit 50 can detect the following operations performed on the touch panel 70*a* or states:

A new touch to the touch panel 70*a* of a finger or pen that has not been in touch with the touch panel 70*a*, i.e., starting of the touch (hereinafter referred to as touch-down)

A state where the touch panel 70*a* is touched by a finger or pen (hereinafter referred to as touch-on)

Movement of a finger or pen while being in touch with the touch panel 70*a* (hereinafter referred to as touch-move)

Separation (release) of a finger or pen that has been in touch with the touch panel 70*a* from the touch panel 70*a*, i.e., ending of the touch (hereinafter referred to as touch-up)

A state where nothing is in touch with the touch panel 70*a* (hereinafter referred to as touch-off)

When the touch-down is detected, the touch-on is simultaneously detected. Unless the touch-up is detected after the touch-down, the touch-on normally continues to be detected. Even when the touch-move is detected, the touch-on continues to be detected. Even when the touch-on has been detected, unless a touch position has moved, the touch-move is not detected. After the touch-up of all the fingers and pens that have been in touch is detected, the touch-off is detected.

These operations/states and coordinates of a position on the touch panel 70*a* at which a finger or pen is in touch therewith are reported to the system control unit 50 via an internal bus. Then, the system control unit 50 determines what kind of operation (touch operation) has been performed on the touch panel 70*a* on the basis of reported information. With regard to the touch-move, even a movement direction of a finger or pen moving over the touch panel 70*a* can be determined for each vertical component/horizontal component on the touch panel 70*a* on the basis of a change in position coordinates. When the touch-move over a predetermined distance or more is detected, it is determined that a slide operation has been performed. An operation of quickly moving a finger over a given distance, while keeping the finger in touch with the touch panel 70*a*, and then releasing the finger is termed a flick. In other words, the flick is an operation of quickly tracing the finger over the touch panel 70*a* in such a manner as to flick the finger thereat. When it is detected that the touch-move has been performed at a predetermined speed or more over a predetermined distance or more and then the touch-up is detected, it can be determined that the flick has been performed (it can be determined that there was the flick subsequently to the slide operation). Furthermore, a touch operation of simultaneously touching (multi-touching) a plurality of locations (e.g., two points) and bringing respective touch positions closer to each other is referred to as pinch-in, while a touch operation of bringing the respective touch positions away from each other is referred to as pinch-out. The pinch-out and the pinch-in are generally referred to as a pinch operation (or simply referred to as pinch). The touch panel 70*a* may be of any of touch panels of various types such as a resistance film type, an electrostatic capacitance type, a surface elastic wave type, an infrared light type, an electromagnetic induction type, an image recognition type, and an optical sensor type. There are also a type that detects the presence of a touch on the basis of contact with the touch panel and a type that detects the presence of a touch on the basis of approach of a finger or pen to the touch panel, and any type may be used.

Figure 3:
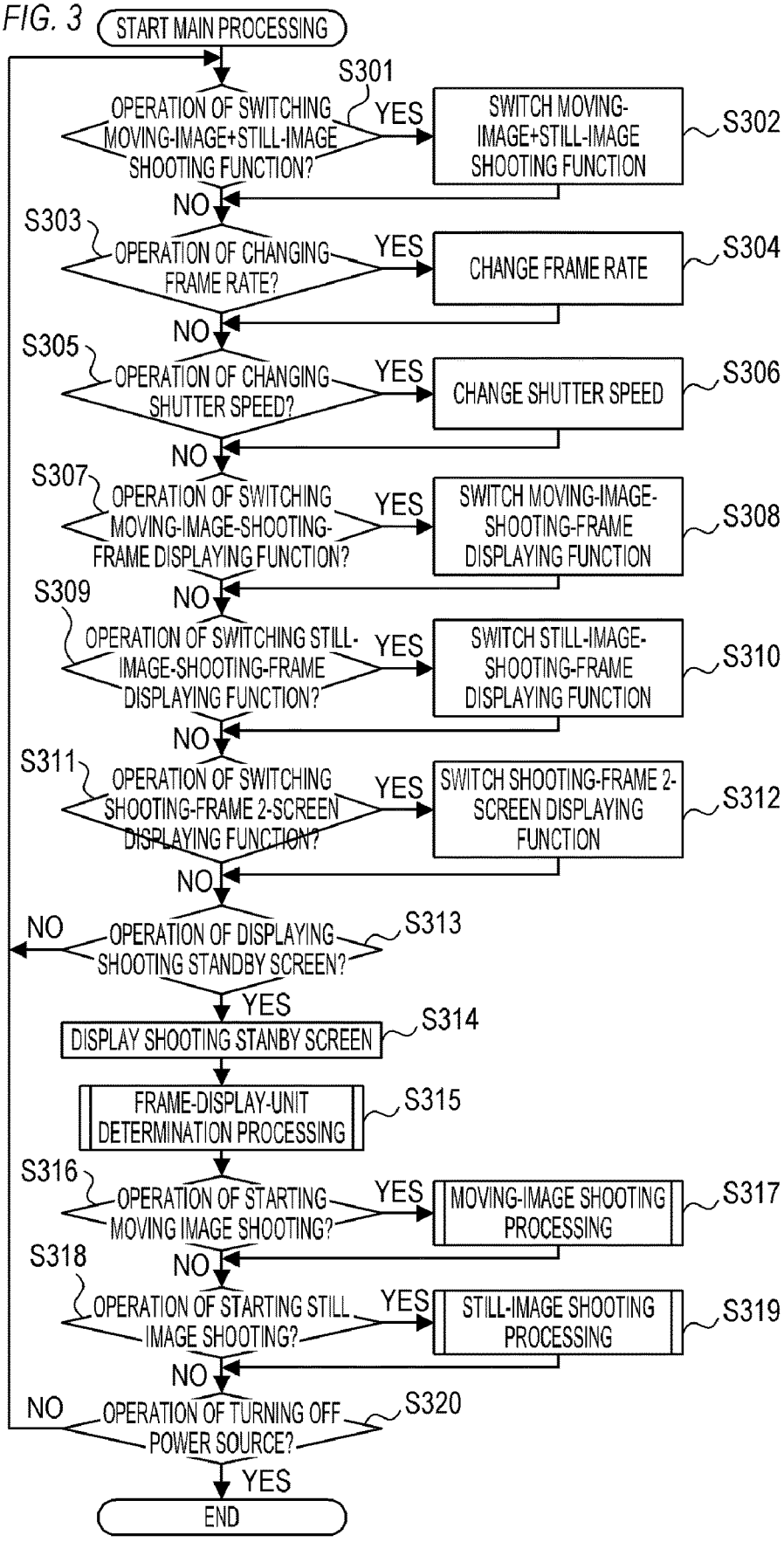
FIG. 3 is a flow chart of main processing.

FIG. 3 is a flow chart of main processing performed in the digital camera 100. In the main processing in FIG. 3, various settings are made, and moving image shooting and still image shooting are performed. The main processing in FIG.

3 is implemented by the system control unit 50 by developing, in the system memory 52, the program stored in the nonvolatile memory 56 and executing the program. For example, when a user operation is performed on the power source switch 72 and the digital camera 100 is activated, the system control unit 50 starts the main processing in FIG. 3.

In S301, the system control unit 50 determines whether or not a user operation of switchably enabling/disabling a moving-image+still-image shooting function (function of performing still image shooting during moving image shooting) has been performed. When the user operation of switchably enabling/disabling the moving-image+still-image shooting function has been performed, the main processing advances to S302, and otherwise, the main processing advances to S303.

In S302, the system control unit 50 switchably enables/disables the moving-image+still-image shooting function.

In S303, the system control unit 50 determines whether or not a user operation of changing a frame rate of still-image continuous shooting (still-image burst capture) has been performed. When the user operation of changing the frame rate of the still-image continuous shooting has been performed, the main processing advances to S304, and otherwise, the main processing advances to S305.

In S304, the system control unit 50 changes the frame rate of the still-image continuous shooting.

In S305, the system control unit 50 determines whether or not a user operation of changing the shutter speed has been performed. When the user operation of changing the shutter speed has been performed, the main processing advances to S306, and otherwise, the main processing advances to S307.

In S306, the system control unit 50 changes the shutter speed.

In S307, the system control unit 50 determines whether or not a user operation of switchably enabling/disabling a moving-image-shooting-frame displaying function (function of displaying a moving-image shooting frame) has been performed. The moving-image shooting frame is an item indicating that the moving image shooting is in progress (moving image shooting is being performed), which is, e.g., a red frame along an outline of the display surface of the display unit 28. When the user operation of switchably enabling/disabling the moving-image-shooting-frame displaying function has been performed, the main processing advances to S308, and otherwise, the main processing advances to S309.

In S308, the system control unit 50 switchably enables/disables the moving-image-shooting-frame displaying function.

In S309, the system control unit 50 determines whether or not a user operation of switchably enabling/disabling a still-image-shooting-frame displaying function (function of displaying a still-image shooting frame) has been performed. The still-image shooting frame is an item indicating that the still image shooting is in progress (the still image shooting is being performed), which is, e.g., a white frame along the outline of the display surface of the display unit 28. When the user operation of switchably enabling/disabling the still-image-shooting-frame displaying function has been performed, the main processing advances to S310, and otherwise, the main processing advances to S311.

In S310, the system control unit 50 switchably enables/disables the still-image-shooting-frame displaying function.

In S311, the system control unit 50 determines whether or not a user operation of switchably enabling/disabling a 2-screen displaying function for shooting frames such as the moving-image shooting frame and the still-image shooting frame (function of simultaneously displaying the shooting frames on two screens (two display surfaces)) has been performed. When the user operation of switchably enabling/disabling the shooting-frame 2-screen displaying function has been performed, the main processing advances to S312, and otherwise, the main processing advances to S313.

In S312, the system control unit 50 switchably enables/disables the shooting-frame 2-screen displaying function. For example, the two screens are the display surface of the display unit 28 included in the digital camera 100 and a display surface of an external display connected to the digital camera 100. The external display is connected to the digital camera 100 by using, e.g., a HDMI (registered trademark) cable.

In S313, the system control unit 50 determines whether or not a user operation of displaying a shooting standby screen (user operation of setting a shooting mode) has been performed. When the user operation of displaying the shooting standby screen has been performed, the main processing advances to S314, and otherwise, the main processing advances to S301. When the shooting mode has already been set (when the shooting standby screen has already been displayed), the main processing advances to S314.

In S314, the system control unit 50 displays a shooting standby screen. On the shooting standby screen, at least a live view image is displayed. Normally, the shooting standby screen is displayed on the display unit 28. During remote shooting, the shooting standby screen may be displayed only on a display unit of an external device (e.g., a smartphone) separate from the digital camera 100 or, alternatively, the shooting standby screen may also be displayed on each of the display unit of the external device and the display unit 28 of the digital camera 100. The shooting standby screen displayed on the display unit of the external device and the shooting standby screen displayed on the display unit 28 of the digital camera 100 may be the same as or different from each other.

In S315, the system control unit 50 performs frame-display-unit determination processing. Details of the frame-display-unit determination processing will be described later using FIG. 4.

In S316, the system control unit 50 determines whether or not a user operation of starting the moving image shooting (e.g., pressing of the moving image button 76) has been performed. When the user operation of starting the moving image shooting has been performed, the main processing advances to S317, and otherwise, the main processing advances to S318.

In S317, the system control unit 50 performs moving-image shooting processing. Details of the moving-image shooting processing will be described later using FIG. 5.

In S318, the system control unit 50 determines whether or not a user operation of starting the still image shooting (e.g., full pressing of the shutter button 61) has been performed. When the user operation of starting the still image shooting has been performed, the main processing advances to S319, and otherwise, the main processing advances to S320.

In S319, the system control unit 50 performs still-image shooting processing. Details of the still-image shooting processing will be described later using FIG. 6.

In S320, the system control unit 50 determines whether or not a user operation of turning OFF the power source of the digital camera 100 (e.g., user operation performed on the power source switch 72) has been performed. When the user operation of turning OFF the power source has been performed, the main processing in FIG. 3 is ended, and otherwise, the main processing advances to S301.

Figure 4:
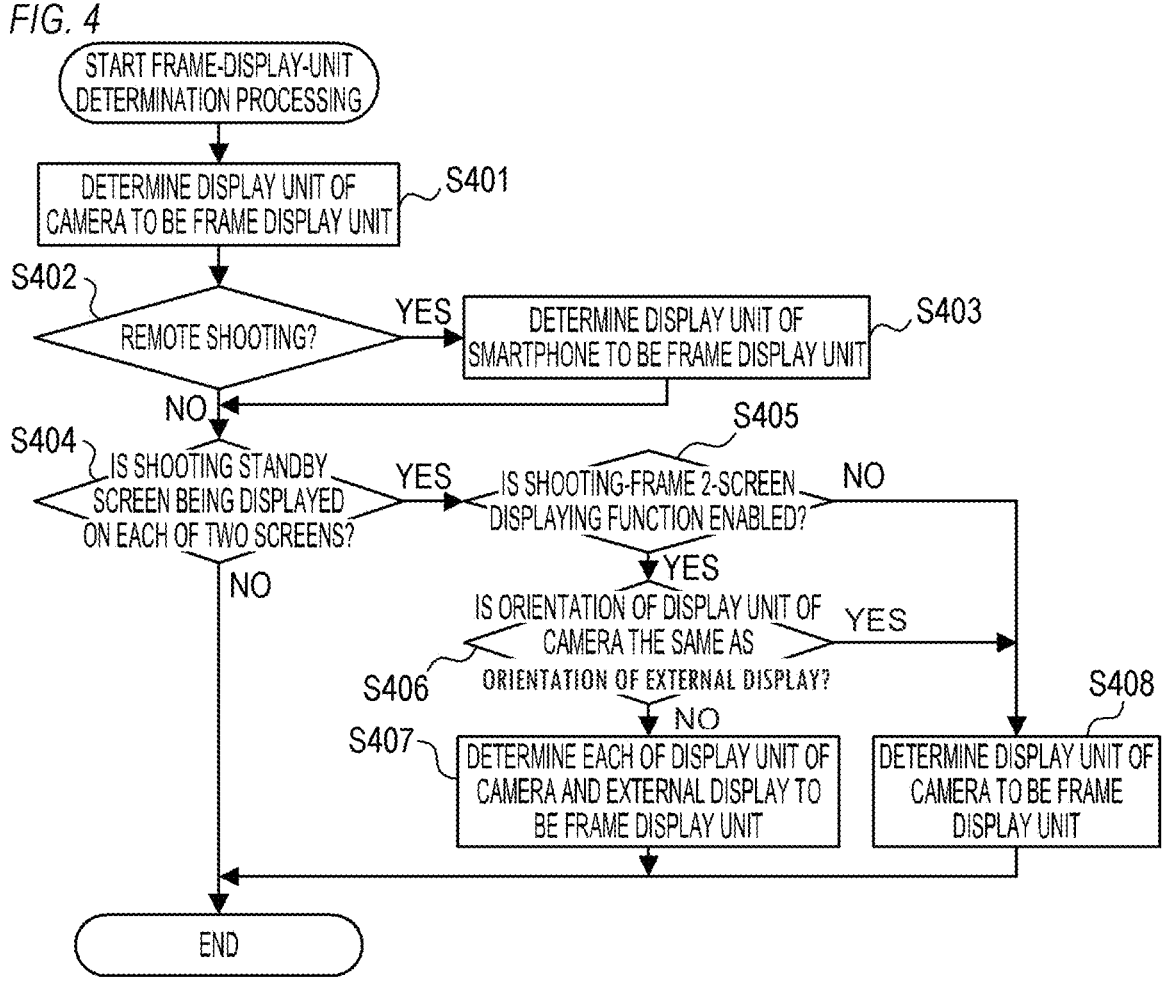
FIG. 4 is a flow chart of frame-display-unit determination processing.

FIG. 4 is a flow chart of the frame-display-unit determination processing performed in S315 in FIG. 3.

In S401, the system control unit 50 determines the display unit 28 of the digital camera 100 to be a frame display unit (display unit that displays shooting frames such as the moving-image shooting frame and the still-image shooting frame).

In S402, the system control unit 50 determines whether or not a state where the remote shooting is to be performed is established. When the state where the remote shooting is to be performed is established, the frame-display-unit determination processing advances to S403, and otherwise, the frame-display-unit determination processing advances to S404. In the present embodiment, it is assumed that the remote shooting using a smartphone is performed, but an external device (communication device) to be used for the remote shooting is not limited to the smartphone, and may also be another external device (e.g., a tablet terminal) having a display unit.

In S403, the system control unit 50 changes the frame display unit from the display unit 28 of the digital camera 100 to a display unit of the smartphone. It can be considered that, during the remote shooting using the smartphone, the user checks not the display unit 28 of the digital camera 100, but the display unit of the smartphone. Accordingly, the display unit of the smartphone is determined to be the frame display unit. Consequently, shooting frames such as the moving-image shooting frame and the still-image shooting frame are displayed on the display unit of the smartphone. As a result, by looking at the display unit of the smartphone, the user can easily recognize that the moving image shooting is in progress and that the still image shooting is in progress. A consideration will be given herein to a case where the shooting standby screen is displayed on each of the display unit of the smartphone and the display unit 28 of the digital camera 100. In this case, shooting frames such as the moving-image shooting frame and the still-image shooting frame are no longer displayed on the display unit 28 of the digital camera 100. Consequently, by looking at the display unit 28 of the digital camera 100, the user can check the live view image with high visibility even during the moving image shooting and during the still image shooting.

In S404, the system control unit 50 determines whether or not the shooting standby screen is being displayed on each of the two screens. In the present embodiment, it is assumed that, in the 2-screen display of the shooting standby screen, the shooting standby screen is displayed on the display unit 28 of the digital camera 100 and on the external display connected to the digital camera 100, but the external device on which the shooting standby screen is to be displayed is not particularly limited. When the shooting standby screen is being displayed on the two screens, the frame-display-unit determination processing advances to S405, and otherwise, the frame-display-unit determination processing in FIG. 4 is ended. When the state where the remote shooting is to be performed is established, even during the 2-screen display of the shooting standby screen, the frame-display-unit determination processing in FIG. 4 may be ended.

In S405, the system control unit 50 determines whether or not the 2-screen displaying function for shooting frames such as the moving-image shooting frame and the still-image shooting frame is enabled. When the shooting-frame 2-screen displaying function is enabled, the frame-display-unit determination processing advances to S406, and otherwise, the frame-display-unit determination processing advances to S408.

In S406, the system control unit 50 determines whether or not an orientation of the display unit 28 of the digital camera 100 is the same as an orientation of the external display. For example, the system control unit 50 uses the communication unit 54 to acquire orientation information of the external display from the external display. Then, on the basis of the acquired orientation information and a sensing result from the orientation sensing unit 55, the system control unit 50 determines whether or not the orientation of the display unit 28 of the digital camera 100 is the same as the orientation of the external display. When the orientation of the display unit 28 of the digital camera 100 is the same as the orientation of the external display, the frame-display-unit determination processing advances to S408, and otherwise, the frame-display-unit determination processing advances to S407.

In S407, the system control unit 50 determines each of the display unit 28 of the digital camera 100 and the external display to be the frame display unit. A conceivable case where the orientation of the display unit 28 of the digital camera 100 is different from the orientation of the external display is a case where the display unit 28 of the digital camera 100 is directed toward a shooter (user), while the external display is directed toward an object of shooting. In such a case, as a result determining each of the display unit 28 and the external display to be the frame display unit, shooting frames such as the moving-image shooting frame and the still-image shooting frame are displayed on each of the display unit 28 and the external display. This allows both of the shooter and the object of shooting to easily recognize that the moving image shooting is in progress and that the still image shooting is in progress.

In S408, the system control unit 50 determines only the display unit 28 of the digital camera 100 to be the frame display unit. Consequently, shooting frames such as the moving-image shooting frame and the still-image shooting frame are not displayed on the external display, but are displayed only on the display unit 28 of the digital camera 100. As a result, by viewing the display unit 28 of the digital camera 100, the user can easily recognize that the moving image shooting is in progress and that the still image shooting is in progress. Moreover, by viewing the external display, the user can check the live view image with high visibility even during the moving image shooting and during the still image shooting. While it is assumed that only the display unit 28 (one display unit) of the digital camera 100 is determined to be the frame display unit, it may also be possible to determine only the external display (another display unit) to be the frame display unit.

Note that, when a specified user operation such as a user operation performed on the mode changeover switch 60 is performed during the frame-display-unit determination processing in FIG. 4, the frame-display-unit determination processing may also be interrupted.

Figure 5:
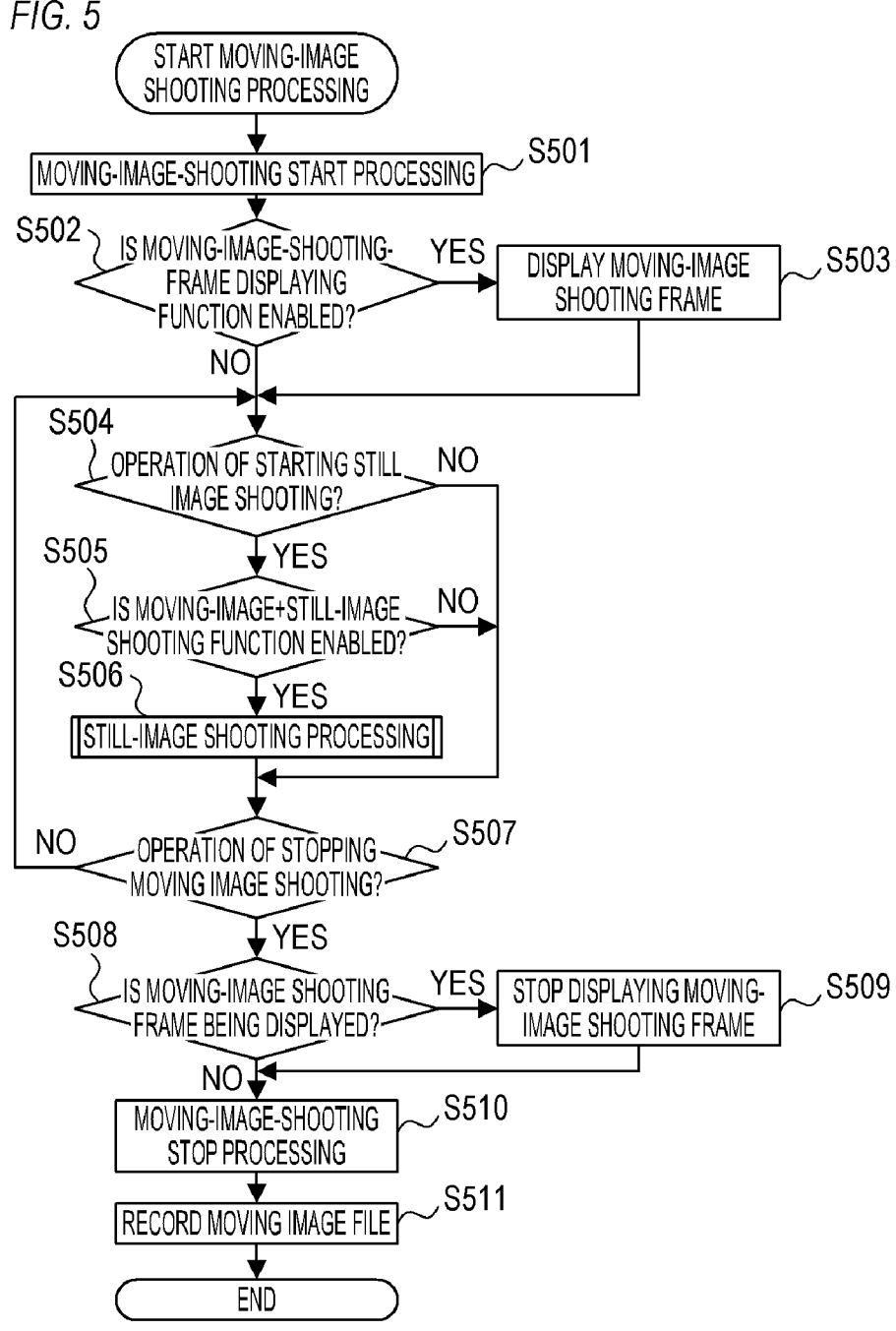
FIG. 5 is a flow chart of moving-image shooting processing.

FIG. 5 is a flow chart of the moving-image shooting processing performed in S317 in FIG. 3.

Figure 7A:
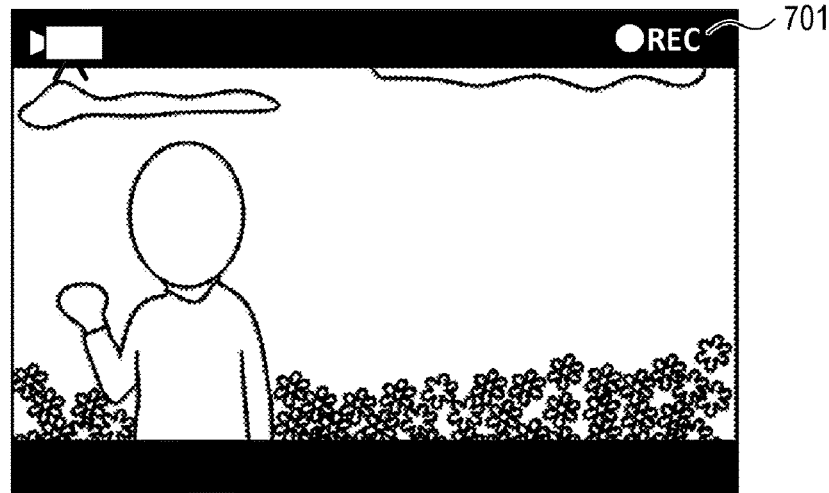
FIGS. 7A to 7C are schematic diagrams illustrating a moving-image shooting screen.

In S501, the system control unit 50 performs moving-image-shooting start processing such as starting of signal reading from the image capturing unit 22. At this time, a screen to be displayed shifts from the shooting standby screen to a moving-image shooting screen. FIG. 7A illustrates an example of the moving-image shooting screen. On the moving-image shooting screen in FIG. 7A, together with the live view image (in superimposed relation on the live view image), a REC icon 701 indicating that the moving image shooting is in progress is displayed. On the moving-image shooting screen, various items other than the REC icon 701 may also be displayed.

In S502, the system control unit 50 determines whether or not the moving-image-shooting-frame displaying function is enabled. When the moving-image-shooting-frame displaying function is enabled, the moving-image shooting processing advances to S503, and otherwise, the moving-image shooting processing advances to S504.

Figure 7B:
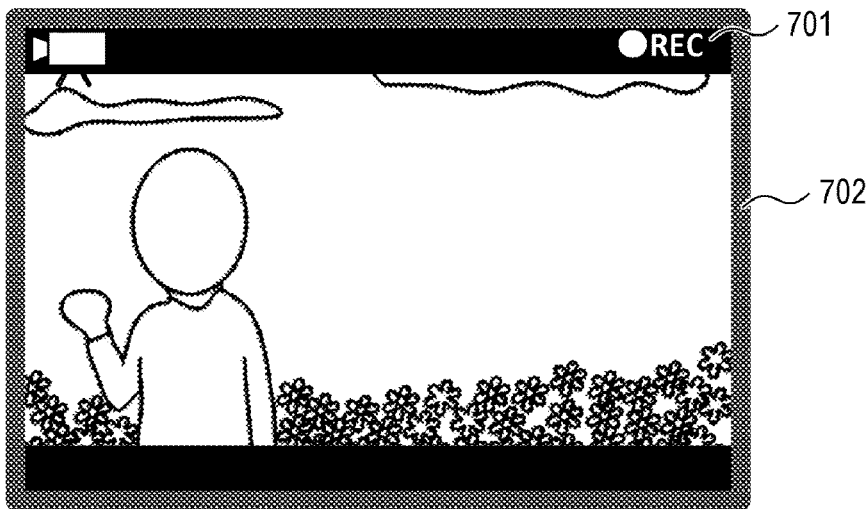

In S503, as illustrated in FIG. 7B, the system control unit 50 displays a red moving-image shooting frame 702 on the frame display unit determined in the frame-display-unit determination processing in FIG. 4. Since the moving-image shooting frame 702 is more noticeable than the REC icon 701, by displaying the moving-image shooting frame 702, the user is allowed to more easily recognize that the moving image shooting is in progress than in a case where only the REC icon 701 is displayed. The moving-image shooting frame 702 is continuously displayed during the moving image shooting (lighting of the moving-image shooting frame). While an example in which the red moving-image shooting frame 702 is displayed as the item indicating the moving image shooting is in progress has been described, a shape, a color, and a size of the item indicating that the moving image shooting is in progress are not particularly limited.

In S504, the system control unit 50 determines whether or not a user operation (e.g., full pressing of the shutter button 61) of starting the still image shooting has been performed. When the user operation of starting the still image shooting has been performed, the moving-image shooting processing advances to S505, and otherwise, the moving-image shooting processing advances to S507.

In S505, the system control unit 50 determines whether or not the moving-image+still-image shooting function is enabled. When the moving-image+still-image shooting function is enabled, the moving-image shooting processing advances to S506, and otherwise, the moving-image shooting processing advances to S507.

In S506, the system control unit 50 performs still-image shooting processing. Details of the still-image shooting processing will be described later using FIG. 6.

In S507, the system control unit 50 determines whether or not a user operation (e.g., pressing of the moving image button 76) of stopping the moving image shooting has been performed. When the user operation of stopping the moving image shooting has been performed, the moving-image shooting processing advances to S508, and otherwise, the moving-image shooting processing advances to S504.

In S508, the system control unit 50 determines whether or not the moving-image shooting frame (moving-image shooting frame 702 in FIG. 7B) is displayed. When the moving-image shooting frame is displayed, the moving-image shooting processing advances to S509. Otherwise, the system control unit 50 stops displaying the REC icon (REC icon 701 in FIG. 7A) and returns the screen to be displayed from the moving-image shooting screen to the shooting standby screen to advance to S510.

In S509, the system control unit 50 stops displaying the moving-image shooting frame (and the REC icon), and returns the screen to be displayed from the moving-image shooting screen to the shooting standby screen. Since the moving-image shooting frame is more noticeable than the REC icon, by stopping displaying the moving-image shooting frame, the user is allowed to more easily recognize that the moving image shooting is stopped than in a case where only the REC icon is stopped from being displayed.

In S510, the system control unit 50 performs moving-image-shooting stop processing such as stopping of signal reading from the image capturing unit 22.

In S511, the system control unit 50 writes a captured moving image as a moving image file to the recording medium 200.

Note that, when a specified user operation such as a user operation performed on the mode changeover switch 60 is performed during the moving-image shooting processing in FIG. 5, the moving-image shooting processing may also be interrupted.

Figure 6:
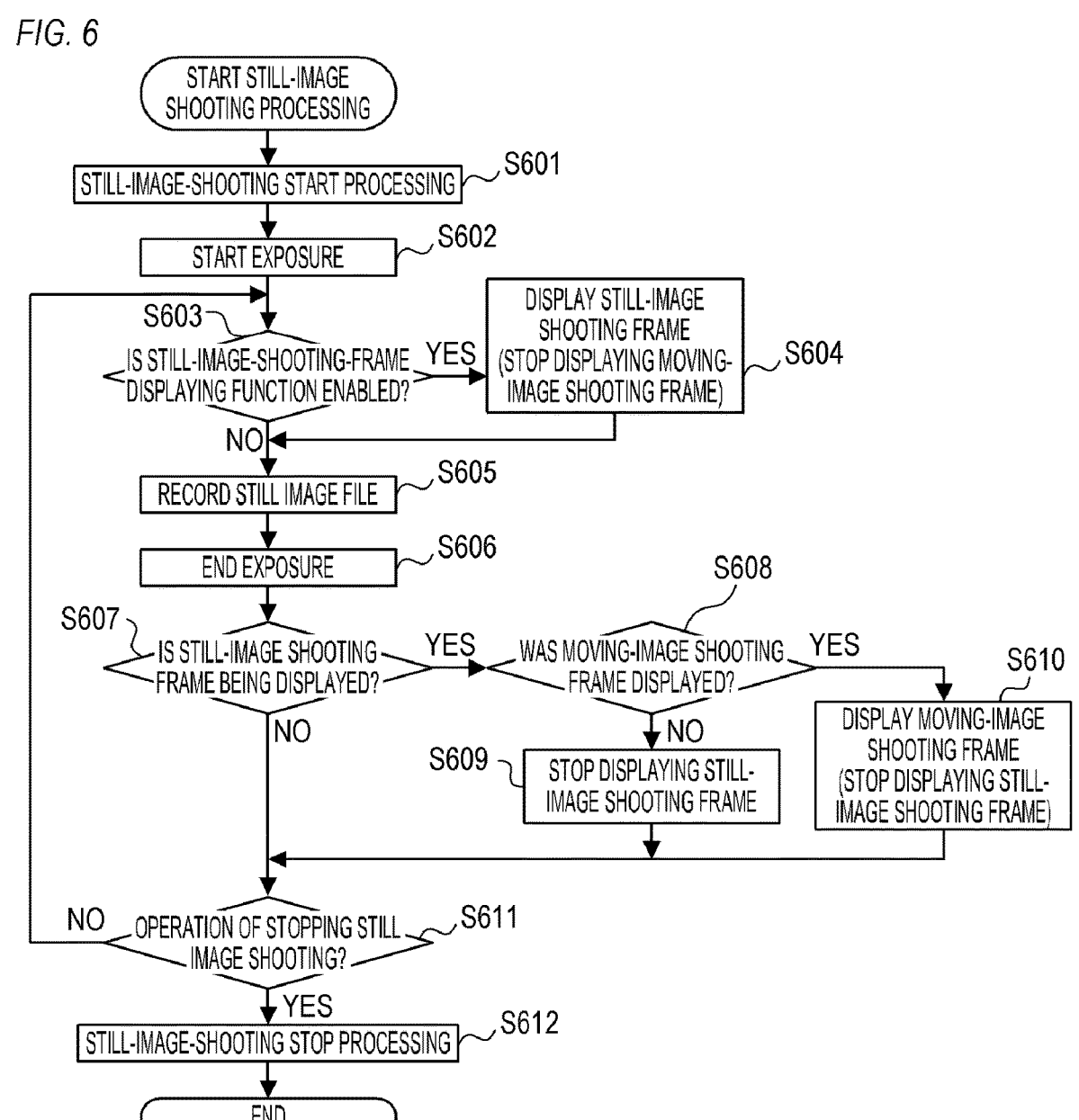
FIG. 6 is a flow chart of still-image shooting processing.

FIG. 6 is a flow chart of the still-image shooting processing performed in each of S319 in FIGS. 3 and S506 in FIG. 5.

In S601, the system control unit 50 performs still-image-shooting start processing such as starting of ranging. Note that, while the moving image shooting is in progress and when processing for the still image shooting (e.g., ranging) is being performed, the current state is maintained.

In S602, the system control unit 50 starts exposure.

In S603, the system control unit 50 determines whether or not the still-image-shooting-frame displaying function is enabled. When the still-image-shooting-frame displaying function is enabled, the still-image shooting processing advances to S604, and otherwise, the still-image shooting processing advances to S605.

Figure 7C:
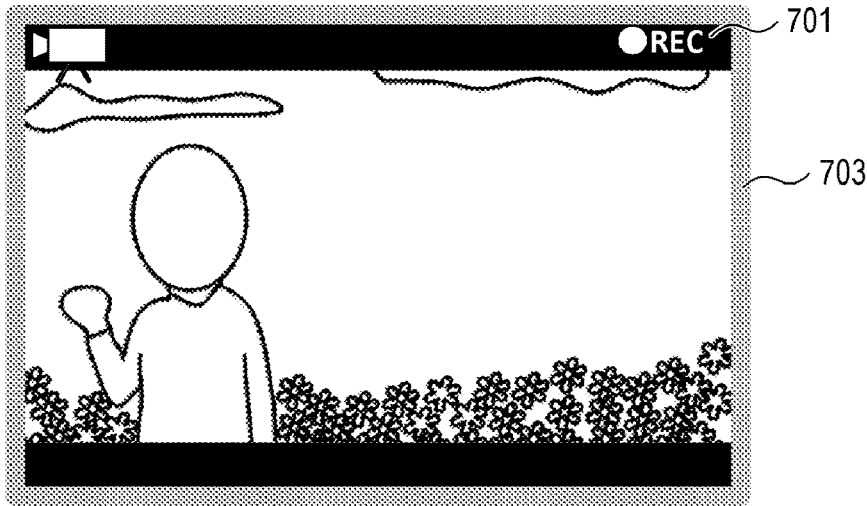

In S604, as illustrated in FIG. 7C, the system control unit 50 displays a white still-image shooting frame 703 on the frame display unit determined in the frame-display-unit determination processing in FIG. 4. This allows the user to easily recognize that the still image shooting is in progress. While the moving image shooting is in progress and when the moving-image shooting frame 702 in FIG. 7B is displayed, the shooting frame to be displayed is switched from the moving-image shooting frame 702 to the still-image shooting frame 703. While an example in which the white still-image shooting frame 703 is displayed as the item indicating that the still image shooting is in progress has been described, a shape, a color, and a size of the item indicating that the still image shooting is in progress are not particularly limited.

During the moving image shooting, the user can recognize that the moving image shooting is in progress whether by looking at the moving-image shooting frame or by looking at the REC icon. Meanwhile, when the still image shooting is performed, the user cannot recognize that the still image shooting is in progress unless the user looks at the still-image shooting frame. Accordingly, the still-image shooting frame (item indicating that the still image shooting is in progress) is preferably more noticeable than the moving-image shooting frame (item indicating that the moving image shooting is in progress). For example, a width (size of the item indicating that the still-image shooting is in progress) of the still-image shooting frame is preferably larger than a width (size of the item indicating that the moving image shooting is in progress) of the moving-image shooting frame. This allows the user to more easily notice the still-image shooting frame and more easily recognize that the still image shooting is in progress. Furthermore, by merely superimposing the still-image shooting frame on the moving-image shooting frame, it is possible to switch the shooting frame to be displayed from the moving-image shooting frame to the still-image shooting frame. Note that a method of switching the shooting frame to be displayed is not particularly limited, and the shooting frame to be displayed may also be switched from the moving-image shooting frame to the still-image shooting frame by performing, e.g., both of processing of stopping displaying the moving-image shooting frame and processing of displaying the still-image shooting frame.

In S605, the system control unit 50 writes the captured still image as a still image file to the recording medium 200.

In S606, the system control unit 50 ends the exposure.

In S607, the system control unit 50 determines whether or not the still-image shooting frame (still-image shooting frame 703 in FIG. 7C) is being displayed. When the still-image shooting frame is being displayed, the still-image shooting processing advances to S608, and otherwise, the still-image shooting processing advances to S611.

In S608, the system control unit 50 determines whether or not the moving-image shooting frame was displayed (before the display of the still-image shooting frame). When the moving-image shooting frame was displayed, the still-image shooting processing advances to S610, and otherwise, the still-image shooting processing advances to S609. Note that, when the display of the moving-image shooting frame during the moving image shooting is assumed, the determination in S608 may also be construed as determination of whether or not the moving image shooting is in progress.

In S609, the system control unit 50 stops displaying the still-image shooting frame (the moving-image shooting frame is also not displayed).

In S610, the system control unit 50 switches the shooting frame to be displayed from the still-image shooting frame to the moving-image shooting frame.

Thus, in the present embodiment, when the still image shooting is performed, the still-image shooting frame is temporarily displayed together with the live view image (blinking of the still-image shooting frame). When the still image shooting is performed in a state where the moving image shooting has been performed and the moving-image shooting frame is displayed, the shooting frame to be displayed is temporarily switched from the moving-image shooting frame to the still-image shooting frame.

Note that, in the present embodiment, an example in which the still-image shooting frame is displayed from the start of the exposure for the still image shooting to the end thereof is described, but a display time period for the still-image shooting frame is not particularly limited. For example, the still-image shooting frame may also be temporarily displayed for a time period based on, e.g., at least one of the shutter speed and the frame rate for the still-image continuous shooting. Specifically, the display time period for the still-image shooting frame may be shorter as the shutter speed is higher or, alternatively, the display time period for the still-image shooting frame may be shorter as the frame rate is higher. To allow the still-image shooting frame to be displayed without any sense of discomfort, the display time period for the still-image shooting frame may also have at least one of an upper limit and a lower limit.

In S611, the system control unit 50 determines whether or not a user operation (e.g., release of the pressing of the shutter button 61) of stopping the still image shooting has been performed. When the user operation of stopping the still image shooting has been performed, the still-image shooting processing advances to S612, and otherwise, the still-image shooting processing advances to S603. Thus, when the still-image continuous shooting is performed, temporary display (blinking) of the still-image shooting frame is repeated. As long as the moving image shooting is in progress, the display of the moving-image shooting frame and the display of the still-image shooting frame are alternately repeated.

In S612, the system control unit 50 performs still-image-shooting stop processing such as stopping of ranging. Note that, while the moving image shooting is in progress and when it is necessary to continuously perform processing for the still image shooting (e.g., ranging), the processing is not stopped, and is continuously performed.

Note that, when a specified user operation such as a user operation performed on the mode changeover switch 60 is performed during the still-image shooting processing in FIG. 6, the still-image shooting processing may also be interrupted.

Figure 8:
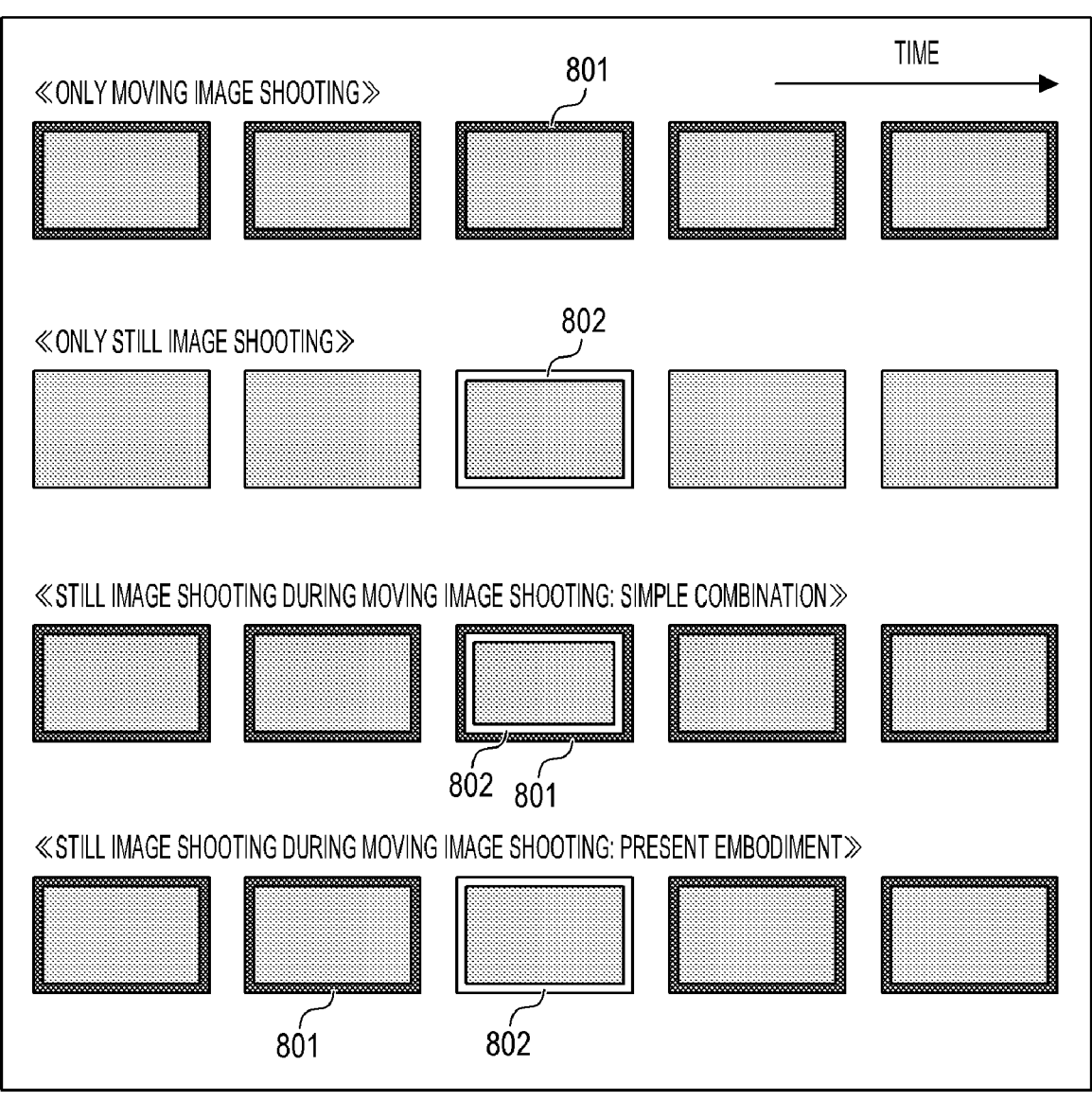
FIG. 8 is a schematic diagram illustrating an operation of displaying shooting frames.

FIG. 8 illustrates an operation of displaying shooting frames such as the moving-image shooting frame and the still-image shooting frame. It is assumed herein that the moving-image-shooting-frame displaying function, the still-image-shooting-frame displaying function, and the moving-image+still-image shooting function are enabled. As illustrated in FIG. 8, when only the moving image shooting is performed, a moving-image shooting frame 801 is displayed. When only the still image shooting is performed, a still-image shooting frame 802 is temporarily displayed. When these operations are simply combined, in a case where the still image shooting is performed during the moving image shooting, both of the moving-image shooting frame 801 and the still-image shooting frame 802 are displayed. As a result, a display region for the live view image is narrowed to significantly deteriorate the visibility of the live view image. According to the present embodiment, when the still image shooting is performed during the moving image shooting, the shooting frame to be displayed is temporarily switched from the moving-image shooting frame 801 to the still-image shooting frame 802. This allows the user to easily recognize that both of the moving image shooting and the still image shooting are being performed, while maintaining the display region for the live view image (and consequently the visibility of the live view image).

Note that the various control described above as that to be performed by the system control unit 50 may be performed by one hardware item, or the entire apparatus may also be controlled by a plurality of hardware items (e.g., a plurality of processors or circuits) by sharing processing.

While the embodiments of the present disclosure have been described in detail, the present disclosure is not limited to these specified embodiments, and various modes within a scope not departing from the gist of this disclosure are also included in the present disclosure. Moreover, each of the embodiments described above merely corresponds to an embodiment of the present disclosure, and the individual embodiments can also be combined appropriately.

In addition, in each of the embodiments described above, a case where the present disclosure is applied to the digital camera (image capturing apparatus) has been described by way of example, but the present disclosure is not limited to this example, and is applicable to any electronic device capable of displaying a live view image. For example, the present disclosure is applicable to a personal computer, a PDA, a smartphone terminal, a mobile image viewer, a printer apparatus, a digital photo frame, a music player, a game machine, an electronic book reader, or the like. The present disclosure is also applicable to a video player, display apparatuses (including a projection apparatus), a tablet terminal, a smartphone, an AI speaker, home appliances, in-vehicle apparatuses, or the like.

The present disclosure is not limited to a main body of an image capturing apparatus, and is also applicable to a control apparatus that communicates with the image capturing apparatus (including a network camera) via wired or wireless communication to remotely control the image capturing apparatus. Examples of the apparatus that remotely controls the image capturing apparatus include apparatuses such as a smartphone, a tablet PC, and a desktop PC. By notifying the image capturing apparatus of commands for causing the image capturing apparatus to perform various operations and make settings from a control apparatus side on the basis of operations performed on the control apparatus side and processing performed on the control apparatus side, it is possible to remotely control the image capturing apparatus. Alternatively, it may also be possible to allow the live view image captured by the image capturing apparatus to be received via wired or wireless communication and displayed on the control apparatus side.

According to the present disclosure, it is possible to allow the user to easily recognize that both the moving image shooting and the still image shooting are being performed, while maintaining the visibility of the live view image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-046964, filed on Mar. 23, 2023, which is hereby incorporated by reference herein in its entirety.

What is claimed is:

1. An electronic device comprising at least one memory and at least one processor which function as:
   an acquisition unit configured to acquire a live view image; and
   a display control unit configured to perform control such that the live view image is displayed, wherein
   during moving image shooting, the display control unit performs control such that a first item indicating that the moving image shooting is being performed is displayed together with the live view image, when still image shooting is performed, the display control unit performs control such that a second item indicating that the still image shooting is being performed is temporarily displayed together with the live view image, when still image shooting is performed in a state where moving image shooting is performed and the first item is displayed, the display control unit performs control such that an item to be displayed is temporarily switched from the first item to the second item, the electronic device is an image capturing apparatus including a first display, the display control unit is capable of performing control such that the live view image is displayed on both of the first display and a second display included in an external device separate from the electronic device, and when the live view image is displayed on both of the first display and the second display, the display control unit performs control such that the first item and the second item are displayed on at least one of the first display and the second display.

2. The electronic device according to claim 1, wherein each of the first item and the second item is a frame.

3. The electronic device according to claim 1, wherein a color of the second item is different from a color of the first item.

4. The electronic device according to claim 1, wherein when still-image continuous shooting is performed during moving image shooting, the display control unit performs control such that temporary display of the second item is repeated to cause display of the first item and display of the second item to be alternately repeated.

5. The electronic device according to claim 1, wherein the display control unit performs control such that the second item is temporarily displayed for a time period based on at least one of a shutter speed and a frame rate for still-image continuous shooting.

6. The electronic device according to claim 1, wherein the display control unit performs control such that the second item is displayed from beginning to ending of exposure for still image shooting.

7. The electronic device according to claim 1, wherein the at least one memory and the at least one processor further function as a setting unit capable of performing setting such that at least one of the first item and the second item is not displayed.

8. The electronic device according to claim 1, wherein the display control unit performs control such that the live view image is displayed on a display included in an external device separate from the electronic device.

9. The electronic device according to claim 1, wherein when the live view image is displayed on both of the first display and the second display, the display control unit performs control such that the first item and the second item are not displayed on the second display, and the first item and the second item are displayed on the first display.

10. The electronic device according to claim 1, wherein when the live view image is displayed on both of the first display and the second display, the display control unit performs control such that the first item and the second item are displayed on both of the first display and the second display.

11. The electronic device according to claim 1, wherein when the live view image is displayed on both of the first display and the second display and when an orientation of the first display is same as an orientation of the second display, the display control unit performs control such that the first item and the second item are not displayed on one of the first display and the second display, and the first item and the second item are displayed on another of the first display and the second display, and when the live view image is displayed on both of the first display and the second display and when orientation of the first display is different from orientation of the second display, the display control unit performs control such that the first item and the second item are displayed on both of the first display and the second display.

12. The electronic device according to claim 1, wherein a size of the second item is larger than a size of the first item.

13. The electronic device according to claim 12, wherein each of the first item and the second item is a frame, and the frame corresponding to the second item is thicker than the frame corresponding to the first item.

14. A control method of an electronic device, comprising:
acquiring a live view image; and
performing control such that the live view image is displayed, wherein
during moving image shooting, control is performed such that a first item indicating that the moving image shooting is being performed is displayed together with the live view image,
when still image shooting is performed, control is performed such that a second item indicating that the still image shooting is being performed is temporarily displayed together with the live view image, and
when still image shooting is performed in a state where moving image shooting is performed and the first item is displayed, control is performed such that an item to be displayed is temporarily switched from the first item to the second item,
the electronic device is an image capturing apparatus including a first display,
the electronic device is capable of performing control such that the live view image is displayed on both of the first display and a second display included in an external device separate from the electronic device, and when the live view image is displayed on both of the first display and the second display, control is performed such that the first item and the second item are displayed on at least one of the first display and the second display.

15. A non-transitory computer readable medium that stores a program, wherein the program causes a computer to execute a control method of an electronic device, the control method comprising:
acquiring a live view image; and
performing control such that the live view image is displayed, wherein
during moving image shooting, control is performed such that a first item indicating that the moving image shooting is being performed is displayed together with the live view image,
when still image shooting is performed, control is performed such that a second item indicating that the still image shooting is being performed is temporarily displayed together with the live view image, and
when still image shooting is performed in a state where moving image shooting is performed and the first item is displayed, control is performed such that an item to be displayed is temporarily switched from the first item to the second item,
the electronic device is an image capturing apparatus including a first display,
the electronic device is capable of performing control such that the live view image is displayed on both of the first display and a second display included in an external device separate from the electronic device, and
when the live view image is displayed on both of the first display and the second display, control is performed such that the first item and the second item are displayed on at least one of the first display and the second display.

* * * * *